Aug. 8, 1961 NOBUO SENSUI 2,995,214
LUBRICANT SUPPLY DEVICE
Filed Feb. 3, 1959
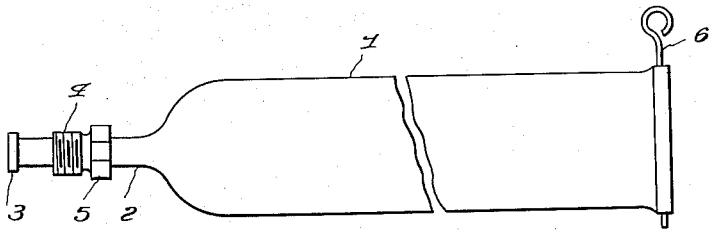
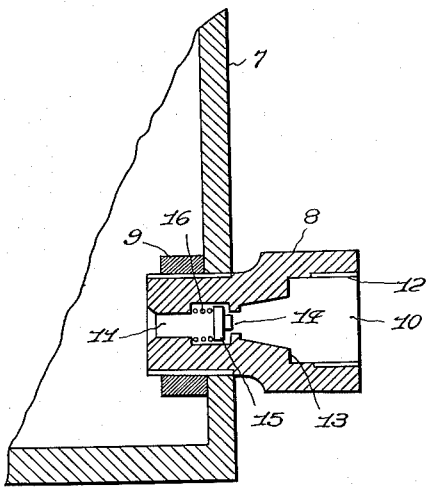

2,995,214
LUBRICANT SUPPLY DEVICE
Nobuo Sensui, Tsurumi-ku, Yokohama-shi, Japan, assignor to Shibaura Kyodo Kogyo Kabushiki Kaisha, Tsurumi-ku, Yokohama-shi, Japan
Filed Feb. 3, 1959, Ser. No. 790,961
Claims priority, application Japan Feb. 24, 1958
3 Claims. (Cl. 184—105)

This invention relates to a lubricant supply device, more particularly to a device wherein a deformable tube containing a lubricant can be easily and firmly attached to a lubricant tank and the lubricant contained in said tube can be supplied to said tank without any leakage and oxidation by air.

In the so-called centralized lubricant supply system, the lubricant in a tank or reservoir is periodically supplied to a plurality of moving parts of a machine by means of an oil pump through a plurality of change over valves. Recently, there is a tendency to use such system as described above in relatively small machines such as automobiles and railway cars, and in such small machines it is advantageous to supplement the lubricant into the lubricant tank from time to time from a suitable portable source of lubricant supply by means of a device such as grease gun. But with a grease gun, it is difficult to firmly connect it with the lubricant tank so as to prevent the leakage of the lubricant at the point of its attachment. Moreover, the grease gun is heavy, complicated in construction and hence expensive, and the used or vacant guns must be recovered.

Therefore, the principal object of this invention is to provide a lubricant supply device which is not only simple and cheap, but also can be easily and firmly attached to a lubricant tank.

Another object of this invention is to provide a portable lubricant container which is able to be firmly attached to a lubricant tank and can be discarded when empty.

A still another object of this invention is to provide a lubricant containing tube made of a deformable material and which can discharge all parts of its contents by a simple operation.

A further object of this invention is to provide an improved adapter for use in combination with said tube container.

Briefly stated, in accordance with this invention, the container of the lubricant is made of a suitable deformable material such as thin aluminum or plastic material so as to have a configuration similar to that of a tooth paste tube. The leading end of the tube is made to have smaller diameter and this end is normally sealed by a flat circular disc. A clamping nut is mounted on said leading end and a wind up pin is secured to the trailing end of the tube. On the side wall of the lubricant tank or reservoir, there is provided an adapter for receiving said leading end of the tube and the clamping nut on it. A non-return valve is provided in said adapter which is opened when the lubricant is discharged into said tank from said tube.

This invention will be more fully understood from the following description, taken in connection with the accompanying drawing in which;

FIG. 1 is a side view of a lubricant tube embodying this invention, and

FIG. 2 is a sectional view of a portion of a lubricant tank and an adapter embodying this invention.

Referring now to FIG. 1 of the accompanying drawing, a tube 1 for containing a suitable lubricant, such for example as mineral oil or grease, is made of a suitable deformable material such as thin soft metal, for example, aluminium, synthetic resin and the like. The tube 1 is constructed to have generally the same shape as a tooth paste tube and has a tubular leading end 2 which is far smaller in diameter than the main portion. The tip of said leading end is normally sealed by a flat circular disc 3 having somewhat larger diameter than the tubular leading end 2. Telescoping on the leading end 2, there is provided a clamping nut 5 having a screw thread 4 on its outer surface. To the flat portion of the trailing end of the tube 1 is secured a transverse wind up pin 6 the function of which will be explained later.

As shown in FIG. 2, an adapter 8 is fixed to a side wall of a lubricant tank or reservoir 7 by means of a nut 9 screwed on the screw thread of said adapter. The adapter is provided with two connecting ports 10 and 11, the port 10 being provided with an internal screw thread 12 which meshes with the screw thread 4 of the clamping nut 5 and a shoulder 13 to receive the flat circular disc 3 when the leading end 2 of the tube 1 is inserted in said port 10. It will be understood that before insertion of the tube 1 into the port 10, a small perforation is provided in the disc 3 by means of using a proper tool such as a drill or needle. The ports 10 and 11 are communicated by a passage 14 in which is disposed a non-return valve 15 which is normally biased to close the passage 14 by means of a compression spring 16.

It should be understood that the lubricant contained in the tank 7 is supplied to a plurality of the moving parts of a machine which require adequate lubricant supply by means of an oil pump not shown through a plurality of change-over valves commonly used in the centralized lubricant supply system, so that the tank must be supplemented with lubricant when its content is decreased below a predetermined amount. To accomplish this, after a small hole is opened in the disc 3, the tube 1 containing a suitable lubricant is brought near the tank and its leading end 2 is inserted in the port 10 of the adapter 8 to cause the disc 3 to engage with the shoulder 13. Thereafter, the clamping nut 5 is tightened to firmly clamp the disc 3 between its end and the shoulder 13. Then the tube is firmly and hermetically attached to the tank, so that there is no leaking of the lubricant through the joint and air does not enter into the tank 7, whereby the oxidation of the lubricant contained in the tank is avoided. The lubricant in the tube 1 is forced out into the tank through the hole of the disc 3, ports 10 and 11 and the check valve 15 in the adapter 8 by turning the pin 6 to wind up the trailing end of the tube 1. When the tube is completely wound up to expel all its contents, the nut 5 is loosened to permit the removal of the used tube which may be discarded. Simultaneously with the removal of the tube, the check valve 15 will automatically close the passage 14.

As will be seen from the foregoing description, the lubricant tube of this invention is simple, light, cheap and easy in its transportion, storing and operation. Moreover, it can be hermetically attached to the lubricant tank by use of a novel adapter, so that the lubricant supply device according to this invention can be used in such small machines as motor cars and railway cars for which the conventional centralized lubricant supply system is too expensive.

It should be understood that this invention is not limited to the illustrated embodiment and that various modifications may be made without departing from the true spirit and scope of this invention.

What I claim is:

1. A lubricant supply device comprising in combination a deformable tube for holding lubricant and dispensing said lubricant when deformed, and an adapter mounted on a lubricant tank for making air-tight connection between said tube and said lubricant tank; said deformable tube comprising a tube body for holding lubricant, a cylindrical nozzle end terminating in a radially extending disc collar, and a clamping nut having screw threads and slidably mounted on said cylindrical nozzle end between the disc collar and the tube body; and said adapter comprising a plug defining a through passageway into said lubricant tank, a spring operated check valve mounted in said passageway for providing a pressure openable closure to said tank, and shoulders and screw threads complementary to the threads on said clamping nut defined in said passageway and outward of said check valve, whereby when said nozzle end of the deformable tube is inserted in said other end of the passageway, said disc collar engages said shoulders and is held in firm abutment and air-tight connection therewith by the tightening engagement of the complementary threads defined in the passageway and on said clamping nut, the lubricant in said tube being transferred to said tank when the pressure of deformation of the tube body is greater than the pressure closing said spring operated check valve.

2. A lubricant supply device according to claim 1, wherein said tube is made of a thin soft metal and is further provided with a wind-up pin at its trailing end for deforming said tube.

3. A lubricant supply device according to claim 1, wherein said tube is made of an artificial resin and is further provided with a wind-up pin at its trailing end for deforming said tube.

References Cited in the file of this patent

UNITED STATES PATENTS

| | | |
|---|---|---|
| 801,227 | Drummond | Oct. 10, 1905 |
| 1,407,997 | Gregory | Feb. 28, 1922 |
| 1,764,186 | Teesdale | June 17, 1930 |
| 2,400,817 | Fox | May 21, 1946 |
| 2,545,167 | Richardson | Mar. 13, 1951 |
| 2,546,475 | Rizzo | Mar. 27, 1951 |